United States Patent [19]

Puls

[11] Patent Number: 4,962,582
[45] Date of Patent: Oct. 16, 1990

[54] METHOD OF MAKING A COMPOSITE MALE HOSE COUPLER HAVING INTEGRALLY MOLDED NUT

[75] Inventor: Kenneth B. Puls, Battle Creek, Mich.

[73] Assignee: Winzeler Stamping Company, Montpelier, Ohio

[21] Appl. No.: 350,292

[22] Filed: May 11, 1989

Related U.S. Application Data

[62] Division of Ser. No. 313,088, Feb. 21, 1989, Pat. No. 4,850,620.

[51] Int. Cl.$^5$ .............................................. B22D 19/02
[52] U.S. Cl. .................... 29/527.4; 29/469.5; 29/DIG. 29
[58] Field of Search .............. 29/237, 527.4, DIG. 29, 29/469.5; 138/109, 103; 264/275, 318; 439/192, 750; 285/174, 256, 258, 423

[56] References Cited

U.S. PATENT DOCUMENTS

| | | | |
|---|---|---|---|
| 2,314,236 | 3/1943 | Mott | 29/237 X |
| 2,822,852 | 2/1958 | Bailey | 29/237 |
| 3,010,869 | 11/1961 | Esteve | 29/DIG. 29 X |
| 3,297,975 | 1/1967 | Pope | 439/750 X |
| 4,466,677 | 8/1984 | Lyman | 439/750 X |

FOREIGN PATENT DOCUMENTS 8373  3/1896  United Kingdom ................ 439/750

Primary Examiner—Joseph M. Gorski
Assistant Examiner—Peter Dungba Vo
Attorney, Agent, or Firm—Marshall & Melhorn

[57] ABSTRACT

A composite male hose coupler comprising a metallic tail piece and an integral plastic nut, and a method of manufacture thereof, are disclosed. The metallic tail piece is formed of annealed brass and includes a cylindrical portion terminating in a radial flange portion disposed generally perpendicular to the longitudinal axis of the cylindrical portion. The plastic nut is formed with a lip portion molded around the entire peripheral margin of the flange portion of said tail piece, and a cylindrical portion disposed oppositely from the tail piece. The outer surface of the cylindrical portion of the plastic nut is provided with threads.

2 Claims, 1 Drawing Sheet

U.S. Patent     Oct. 16, 1990     4,962,582 ns 19. The male hose coupler of the present invention

METHOD OF MAKING A COMPOSITE MALE HOSE COUPLER HAVING INTEGRALLY MOLDED NUT

This application is a division of application Ser. No. 07/313,088, filed Feb. 21, 1989, now U.S. Pat. No. 4,850,620.

FIELD OF THE INVENTION

This invention pertains generally to hose couplers, and more particularly to composite male hose couplers for the ends of flexible, resilient hoses of the so-called garden hose type.

BACKGROUND OF THE INVENTION

Garden hoses made of various forms of rubber and plastic are generally provided with so-called male and female end couplers by which the hoses are connected to one another, to faucets or spigots supplying liquid thereto, and to nozzles, sprinklers, etc. for dispensing the liquid. On currently marketed hoses such couplers, which are permanently affixed to the hose ends during production of the hose assembly, commonly comprise threaded male and female couplers, made of brass or the like, which include a ferrule placed over the outer end of the hose. A cylindrical tail piece, again of brass or the like, is introduced into the hose end and permanently expanded outwardly to urge the hose into liquid-tight engagement with the ferrule. These threaded male and female couplers may also be formed of plastic. In such couplers, a plastic cylindrical tail piece is inserted into the hose end and a clamp member, generally of brass, surrounds the external periphery of the hose and is crimped inwardly after being placed around the hose, to urge the hose into liquid-tight engagement with the tail piece.

The male couplers have heretofore generally been fabricated either entirely of metal or entirely of plastic. However, each of these has certain disadvantages. Thus, metallic couplers are relatively costly to fabricate and assemble. Both the material itself and the forming process are comparatively expensive. Metallic couplers are also susceptible to being permanently deformed or crushed under heavy loads, such as when run over by an automobile tire, and thus made unusable. On the other hand, when male couplers are made entirely of plastic, it is necessary to place a metallic ferrule around the periphery of the hose end and crimp it inwardly to urge the hose into liquid-tight engagement with the tail piece, because the plastic tail piece cannot be expanded. This results in a male coupler which cannot be assembled on the hose with existing conventional expansion equipment and which may have an aesthetically objectionable appearance.

SUMMARY OF THE INVENTION

In accordance with the invention, there is provided a composite male hose coupler comprised of a metallic tail piece upon which has been integrally molded a plastic nut. The metallic tail piece, preferably formed of brass, more particularly comprises a cylindrical portion terminating in a radial flange portion which is generally perpendicular to the axis of the cylindrical portion. The plastic nut includes a lip portion which is molded around the entire peripheral margin of the flange portion of the brass tail piece, and a cylindrical portion disposed opposite from the metallic tail piece. The periphery of the flange portion is non-circular, e.g. polygonal, in outline so as to preclude rotation of the tail piece relative to the molded-on plastic nut. The outer surface of the cylindrical portion of the plastic nut is provided with threads for mating with an appropriate female coupler.

The coupler may be affixed to the hose end by inserting the cylindrical portion of the metallic tail piece into the end of the hose and placing a ribbed ferrule around the outer circumference of the hose end. The cylindrical portion of the metallic tail piece is then expanded and formed with ribs in the conventional manner so that the hose is urged into liquid-tight engagement with the ribbed ferrule.

It is an object of the present invention to provide durable composite male couplers for hoses;

Another object of the invention is to provide such couplers which are less expensive to produce than comparable metallic couplers;

Another object of the invention is to provide such couplers which are less susceptible to damage under heavy loads than comparable metallic couplers;

Still another object of the invention is to provide such couplers which can be assembled on hoses by existing production assembly expansion equipment without modification and/or changeover other than expansion fingers;

Other objects and advantages will become more apparent during the course of the following description when taken in connection with the accompanying drawings.

BRIEF DESCRIPTION OF THE DRAWINGS

In the drawings, wherein like numerals refer to like parts throughout.

DESCRIPTION OF THE PREFERRED EMBODIMENTS

Figure 1:
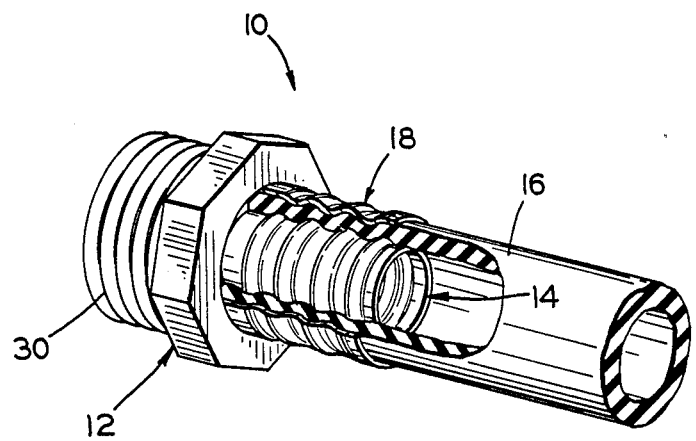
FIG. 1 is a perspective view of the composite male hose coupler of the present invention affixed to a section of hose, with parts cut away.

Referring now to the drawings, there is illustrated generally at 10 in FIG. 1 a composite male hose coupler embodying the present invention. More particularly, the hose coupler includes a plastic nut 12 which has been integrally molded around a metallic tail piece 14. The end segment of a hose 16 is permanently affixed to the hose coupler by the combination of the metallic tail piece 14 and a ferrule 18 formed with annular depressions 19. The male hose coupler of the present invention is adapted to be threadedly interconnected in the usual manner with a conventional female hose coupler (not shown) as well as with a nozzle, sprinkler or other liquid dispensing device.

Figure 2:
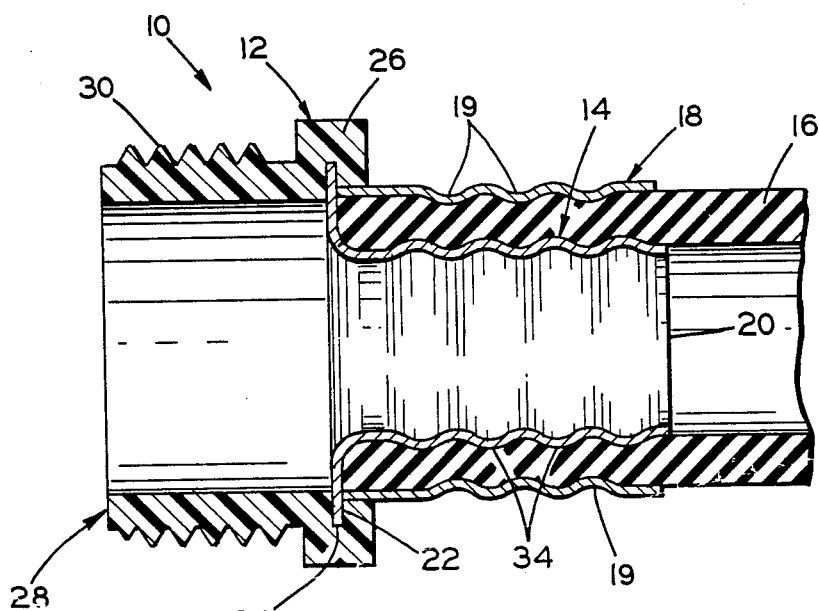
FIG. 2 is a longitudinal-sectional view of the composite male hose coupler illustrated in FIG. 1.

As best seen in FIG. 2, the metallic tail piece 14 more particularly includes a cylindrical portion 20 terminating in a radial flange portion 22 generally perpendicular to the longitudinal axis of the cylindrical portion 20, and including a peripheral margin 24. The plastic nut 12 more particularly includes a lip portion 26 which is molded around the entire peripheral margin 24 of the radial flange portion 22, and a cylindrical portion 28 disposed oppositely from the tail piece 14. The outer circumference of the cylindrical portion 28 is provided with threads 30 for mating with an appropriate female coupler. In a preferred embodiment, the periphery of the lip portion 26 of the plastic nut 12 is non-circular, for example, octagonal, in outline. Such a configuration provides the user with an improved site for gripping the male hose coupler and/or permits the use of a wrench when effecting attachment thereof.

Figure 3:
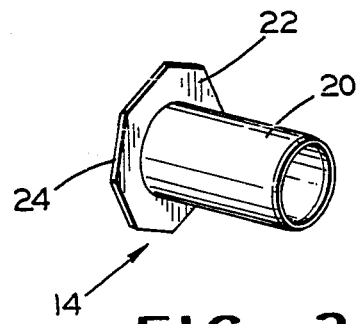
FIG. 3 is a perspective view of the tail piece of the composite male hose coupler.

In a preferred embodiment, the periphery 24 of the flange portion 22 of the metallic tail piece 14 is formed with a non-circular outline. In FIG. 3, there is illustrated the metallic tail piece 14 in one preferred embodiment. In this particular embodiment, the periphery 24 of the flange portion 22 is octagonal in outline. The octagonal shape of the periphery 24 inherently precludes rotation of the tail piece relative to the plastic nut should the bond between the tail piece 14 and the molded plastic nut 12 fail. Prevention of such relative rotation is critical, for otherwise, relative rotation between the hose 16 and the plastic nut 12 will also necessarily occur since the end segment of the hose 16 has been permanently affixed between the tail piece 14 and the ferrule 18. This would obviously greatly impede coupling and uncoupling of the male hose coupler to/-from an appropriate female hose coupler, faucet, sprinkler or other liquid dispensing device.

In fabricating the composite male hose coupler of the present invention, the tail piece 14 is formed as of annealed brass, with the cylindrical portion 20 terminating in the radial flange portion 22 generally perpendicular to the longitudinal axis of the cylindrical portion 20, the periphery 24 of the flange portion 22 being formed with an octagonal or other polygonal outline. The brass is annealed to the point where it can be expanded up to approximately 30 percent without failing.

The flange portion 22 of the brass tail piece 14 is then placed into a mold cavity defining the configuration desired for the plastic nut 12, and the mold cavity is filled with a suitable plastic material. The plastic nut 12 is advantageously formed of an impact resistant nylon which is virtually unbreakable when subjected to the forces typically encountered by hose couplers which have been affixed to garden hoses. This material, and the process of forming it, are relatively inexpensive when compared to the brass used in conventional hose couplers, thus providing a further commercial advantage. However, the material is not limited to nylon, but may include other thermo plastic as well as thermo set plastic materials found suitable for like applications.

In the mold, the plastic material encases the flange portion 22 of the brass tail piece 14, forming the lip portion 26 of the plastic nut 12. Following curing of the plastic material, the brass tail piece 14 and the plastic nut 12 will be integrally bonded together. The completed composite male hose coupler is then removed from the mold in the conventional manner.

When assembling the hose coupler 10 to the end segment of a hose 16, the cylindrical portion 20 of the tail piece 14 is inserted into the hose 16 and a ferrule 18 having the annular depressions 19 is placed around the outer circumference of the hose 16. Then, using conventional expansion equipment, the cylindrical portion 20 is expanded to urge the hose 16 into liquid-tight engagement with the ferrule 18. During expansion, the cylindrical portion 20 is formed with annular ribs 34 which are disposed intermediate and cooperate with the annular depressions 19 of the ferrule 18 to permanently clamp the hose 16 therebetween and lock it to the coupler 10 so as to prevent any axial separation therebetween. Thus, the ferrule 18 need not be crimped inwardly after being placed around the hose 16, as is required when the tail piece 14 is composed of plastic which is incapable of being expanded outwardly.

The composite male hose coupler of the present invention thus combines the advantages of an annealed brass tail piece 14 with those of an impact resistant plastic nut 12. The resulting hose coupler is less expensive and less susceptible to damage under heavy loads than conventional metallic couplers, can be assembled on hoses by existing production assembly expansion equipment, and has an aesthetically pleasing appearance.

It is to be understood that the forms of the invention herewith shown and described are to be taken as illustrative embodiments only, and that various changes in the shape, size and arrangement of parts may be reasserted to without departing from the spirit of the invention.

What is claimed is:

1. A method of producing a composite male hose coupler including a metallic tail piece and an integrally molded nut of plastic material, comprising:
    (A) forming a metallic tail piece with said cylindrical portion having a longitudinal axis, said metallic tail piece terminating in a radial flange portion which is generally perpendicular to and surrounds the longitudinal axis of the cylindrical portion;
    (B) placing the flange portion of said metallic tail piece into a mold cavity surrounding said flange portion and defining a desired configuration of said nut;
    (C) forming said desired configuration of said nut by filling said mold cavity with a plastic material, thereby causing the plastic material to surround and embed the flange portion of said metallic tail piece and thereby forming a completed composite male hose coupler;
    (D) curing the plastic material; and
    (E) removing the completed composite male hose coupler from the mold cavity.

2. The method as defined in claim 1, wherein the periphery of the flange portion of said metallic tail piece is formed with a non-circular outline.

* * * * *